United States Patent [19]

Boehnke et al.

[11] Patent Number: 5,548,644
[45] Date of Patent: Aug. 20, 1996

[54] HANDSET FOR A TELEPHONE STATION

[75] Inventors: Gerd Boehnke, Bottrop; Juergen Reuschel, Bocholt; Heinz-Dieter Mueller, Emmerich; Karl-Heinz Klauker, Dorsten, all of Germany

[73] Assignee: Siemens Aktiengesellschaft, Munich, Germany

[21] Appl. No.: 336,978

[22] Filed: Nov. 10, 1994

[30] Foreign Application Priority Data

Nov. 24, 1993 [DE] Germany ............... 9317982 U

[51] Int. Cl.⁶ .................................................. H04M 1/00
[52] U.S. Cl. ........................................... 379/433; 379/428
[58] Field of Search ..................... 379/428, 429, 379/433, 434, 430; 381/157, 168, 169, 205

[56] References Cited

U.S. PATENT DOCUMENTS

| 4,385,209 | 5/1983 | Greason et al. . |
| 4,636,591 | 1/1987 | Kuhfus et al. . |
| 4,712,236 | 12/1987 | Brown et al. . |
| 4,731,833 | 3/1988 | Gumb et al. . |
| 4,937,858 | 6/1990 | Girscher et al. . |
| 5,144,656 | 9/1992 | Oku ........................................ 379/433 |

FOREIGN PATENT DOCUMENTS

| 0166198 | 2/1987 | European Pat. Off. . |
| 0161735 | 3/1987 | European Pat. Off. . |
| 3727328C1 | 9/1988 | Germany . |

OTHER PUBLICATIONS

Patent Abstracts of Japan—JP 62209952—11-03-86.

Primary Examiner—Jeffery Hofsass
Assistant Examiner—Jack Chiang
Attorney, Agent, or Firm—Hill, Steadman & Simpson

[57] ABSTRACT

A handset for a telephone station composed of an upper shell and a lower shell in which a telephone receiver and transmission capsule are arranged. The telephone receiver and transmission capsule are contacted to the lines of the handset connecting cable via insulation displacement contacts provided at them. The transmission capsule is designed so that it optimally meets acoustical requirements, ease of assembly and matching to various designs made of it. The transmission capsule is formed by an electret microphone attached on a separate holder. The holder is designed such that it can be employed in various handset types and can be matched to the respectively required antechamber volume of the handset.

9 Claims, 3 Drawing Sheets

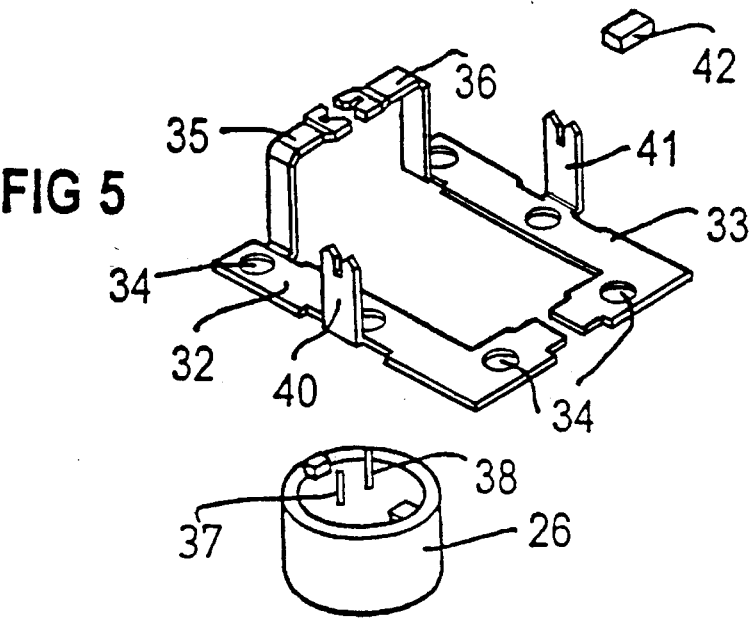
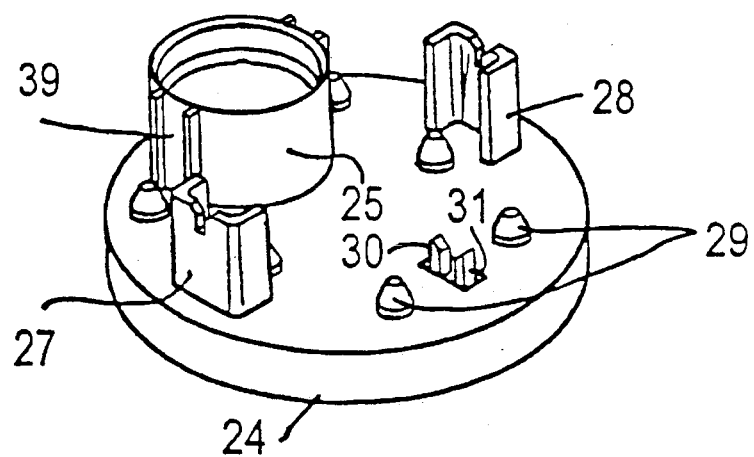
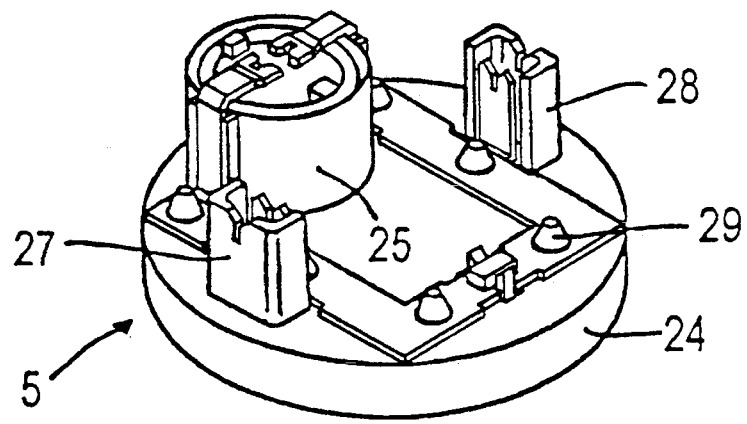

HANDSET FOR A TELEPHONE STATION

BACKGROUND OF THE INVENTION

The present invention comprises a handset for a telephone station, said handset being composed of an upper shell and a lower shell and a telephone receiver and transmitter capsule arranged therein. The receiver and transmitter capsule are contacted to the lines of the handset connecting cord via insulation displacement contacts provided thereat.

For example, DE 37 27 328 C1 discloses a handset constructed in this way. The telephone receiver and transmitter capsule accepted by the lower shell each respectively comprise insulation displacement posts that are pressed into, and are thus contacted with, the line pair of the cord with noses that are provided at the upper shell and which embrace the insulation displacement posts when the housing shells are assembled.

Whereas dynamic transducers are usually employed as telephone receivers, electret microphones are employed in many handsets for reasons of design, and thus for reasons of space. When preparing the electret microphone for employment in the handset, a capacitor was soldered onto the electret, and the leads were subsequently attached by soldering. The electret microphone prepared in this way was accommodated in a separate holder that was in turn introduced into the handset.

A further version for fastening the electret microphone in the handset is that the electret is first introduced into a holder. This holder is mounted on a printed circuit board on which the capacitor is also arranged. The lead ends projecting through corresponding clearances in the printed circuit board are connected to the printed circuit board in a following work step. When assembling the handset, the electret holder is pressed onto a seal in the region of the lower shell, this seal corresponding to the electret holder in terms of contour.

A further version is that the electret is inserted into a rubber bushing. Subsequently, the microphone pre-assembled in this way is built into a specific receptacle in the handset shell.

SUMMARY OF THE INVENTION

It is an object of the invention to design the assembly for the electret microphone such that the demands made thereof in view of acoustics, ease of assembly and adaptation to various designs are optimally met.

This object is achieved in that the transmitter capsule is formed by an electret microphone attached to a separate holder. The holder is designed such that it can be universally utilized in various handset types and can be matched to the required antechamber volume of the handset.

A holder for the electret microphone designed in this way can be employed in various handset types since means are provided at the holder that make it possible to adapt the required antechamber volume to a highly varying plurality of acoustic transmission openings. This can occur, for example, in that the holder is connectable to the lower shell of the handset and comprises at least two annular contours in this region that, dependent upon application, cooperate with annular receptacles in the lower shell that are matched thereto in terms of diameter. Given differently designed handset types, the required antechamber volume can thus be formed for the electret microphone module so that the holder can be employed in a plurality of handset designs.

According to a preferred embodiment of the holder for the electret microphone that can be completely manufactured with an automatic fabrication unit, this holder can be composed of a base member that comprises a receptacle for the electret microphone, whereby fastening means for contact springs, resilient pegs for clampable acceptance of additional electrical component parts, and insulation displacement contacts for the electrical connection of the microphone module to the connecting cord for the handset are provided at the base member. In this embodiment, the electret is introduced into the receptacle in properly polarized fashion and is connected to parts of the contact springs. The auxiliary components in the form of an EMV capacitor or of a Zener diode (surve voltage protection) can thus be mounted in clamped fashion between the resilient pegs at the base member, and can be subsequently soldered to the corresponding parts of the contact springs. For setting the electret sensitivity with a resistor, a respective parting location must be provided at the contact springs. This is then bridged with the resistor matched to the electret. This sensitivity tuning is especially meaningful, given an automated introduction of the electret into the holder, since the polarization must in fact be measured before the introduction of the electret. However, the actual sensitivity of the electret can be immediately identified in this case. The tuning resistor for the required rated sensitivity can be selected on the basis of this identified actual sensitivity.

A plurality of domes can be provided at the base member of the holder for fixing the contact springs, these domes engaging into holes in the contact springs that correspond with them in terms of number. A latched connection between the domes and the contact springs can thereby be produced. The domes can also be heat-deformed after the contact springs are put in place, so that a reliable connection of the contact springs to the base member is achieved. The contact springs themselves can be designed in such a way that they are constructed of a base area containing holes, regions that are angularly bent off relative to this base area and that contain the clamping contacts, and of further webs angularly provided relative to the base areas and directed toward one another. These latter webs comprise terminal contacts for the terminal pins of the electret microphone at their free end regions spaced from one another. Furthermore, the insulation displacement contacts can be constructed of at least one strain relief element and of one clamping contact aligned with this strain relief element. When assembling the handset, for example, it is thus possible to center the corresponding conductors for the connection of the telephone receiver and transmitter capsule in advance, i.e. the conductors are first held lightly clamped at their insulation in the strain relief area, are subsequently impressed in an apparatus into the clamp region allocated to them, and are contacted to the insulation displacement post therein.

BRIEF DESCRIPTION OF THE DRAWINGS

FIG. 5 is an exploded view of a second embodiment of the holder for an electret microphone; and FIG. 6 shows the holder of FIG. 5 in its assembled condition.

DESCRIPTION OF THE PREFERRED EMBODIMENTS

Figure 1:
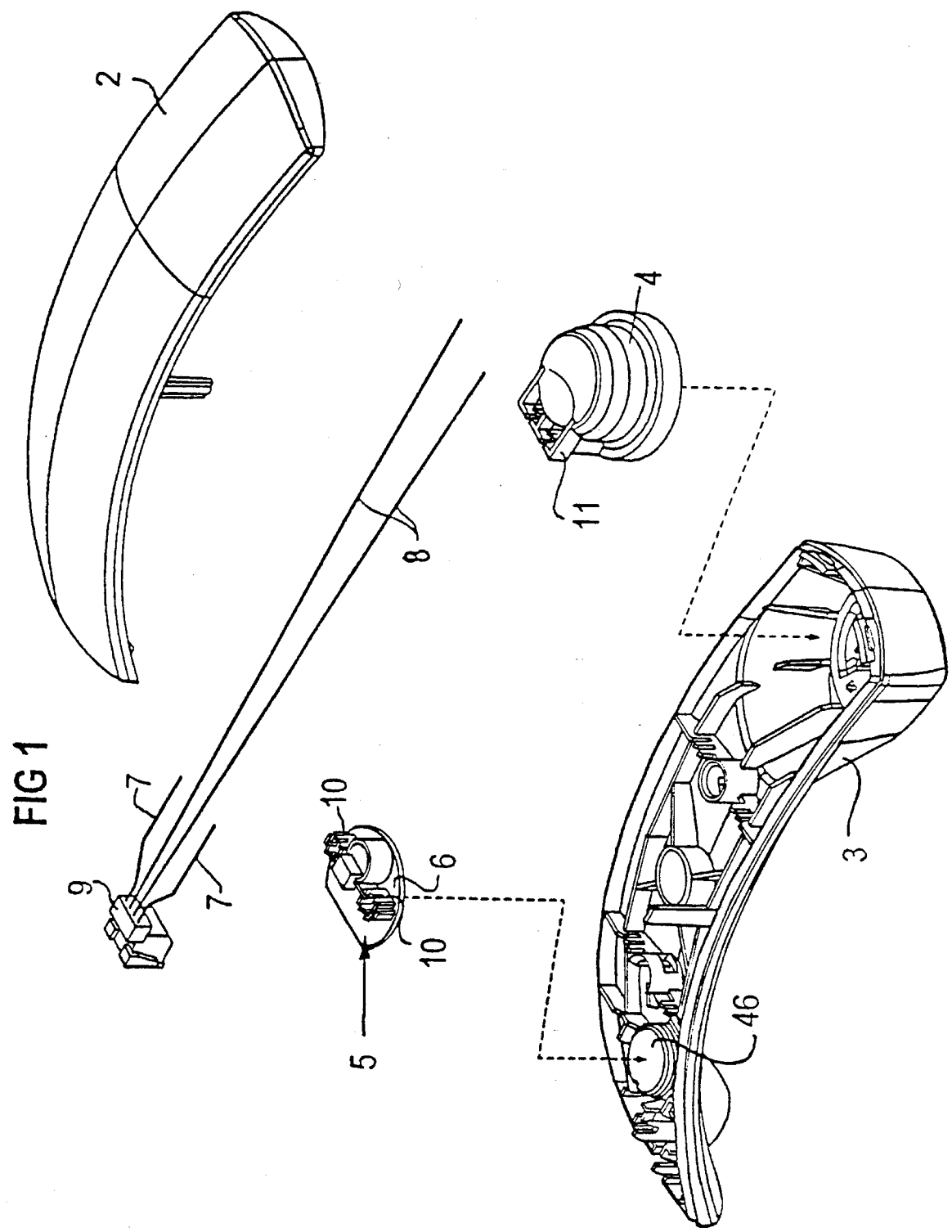
FIG. 1 is an exploded view of the handset composed of an upper shell and a lower shell, and having a telephone receiver and a microphone.
Figure 2:
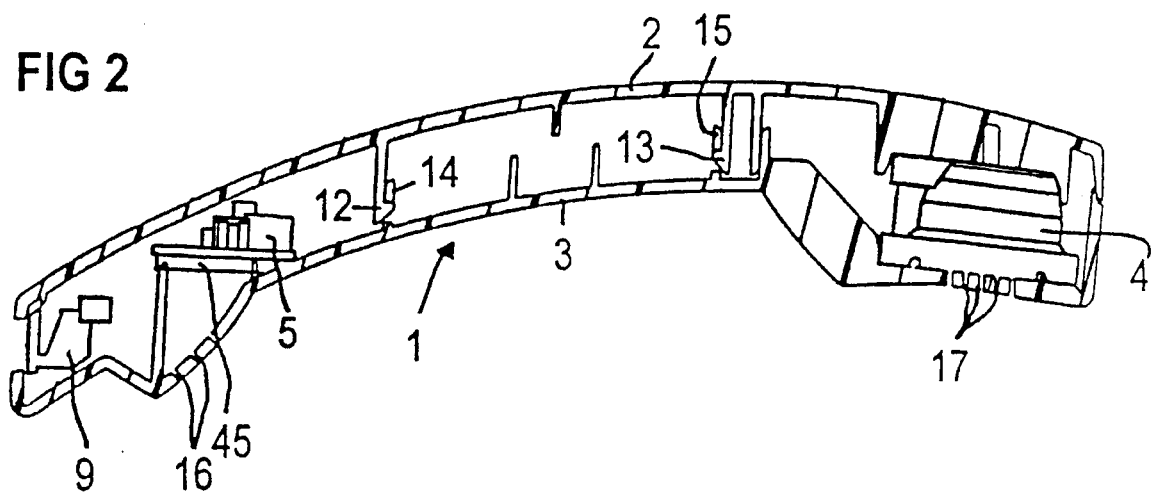
FIG. 2 is a sectional side view of the assembled handset with the introduced component parts.

The handset 1 shown in FIG. 1 is composed of the upper shell 2 and of the lower shell 3 that are joined by a snap-in connection, as may be seen from FIG. 2. The lower shell 3 serves the purpose of accepting a telephone receiver 4 in the form of a dynamic transducer as well as of accepting a microphone module 5 that comprises an electret microphone in this case and is secured on a holder 6 universally employable for various handset types. The electrical connection of the telephone receiver 4 as well as of the microphone 5 occurs via conductor pairs 7 and 8 that extend from a common plug jack 9. The connection of the conductor pairs 7 and 8 to the telephone receiver 4 and to the microphone module 5 is undertaken with know insulation displacement posts or contacts 10 and 11. Each insulation displacement post or contact comprises a region wherein the conductor impressed into a clamping slot is contacted to the post upon parting of its insulation, and comprises a further region arranged parallel to this region and having a slot that embraces the conductor at its insulation and thus serves for the strain relief of the actual contact location. These insulation displacement contacts or posts shall be discussed in greater detail later.

In the present embodiment (FIGS. 3 and 4), the holder 6 for the electret microphone comprises an annular contour 45 at its surface 44 facing away from the surface 43 that accepts the component parts. This annular contour 45 cooperates with an annular receptacle 46 arranged in the lower shell 3 of the handset which is matched to it in terms of diameter, i.e. the holder 6 for the microphone is pressed onto the receptacle 46 in the lower part. The annular contour 45 of the holder 6 thereby forms the required antechamber volume for the microphone module 5.

FIG. 2 shows the handset 1 in the assembled condition of the upper shell 2 and the lower shell 3. It may be clearly seen from this FIG. 2 how catch hooks 12 and 13 attached to the upper shell 2 cooperate with catch receptacles 14 and 15 corresponding to them in terms of shape. The component parts such as the microphone module 5, the telephone receiver 4 as well as the plug jack 9 are accommodated in the handset housing. The acoustic transmission openings 16 are provided in the lower shell in the region of the microphone 5 and the acoustic transmission openings 17 are provided therein in the region of the telephone receiver 4.

Figure 3:
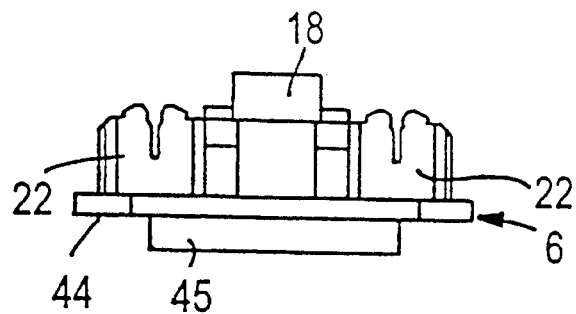
FIG. 3 is a side view of the holder for the first embodiment of an electret microphone.
Figure 4:
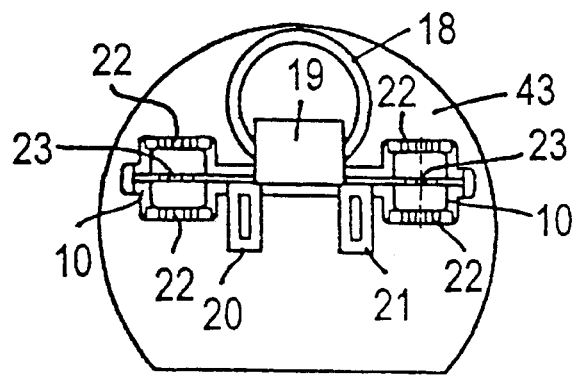
FIG. 4 is a plan view onto the holder of FIG. 3.

FIGS. 3 and 4 show a first embodiment of a microphone module. The microphone module is composed of a holder 6, of a receptacle 18 for the electret microphone, as well as of a contact arrangement for contacting the electret microphone and of an electrical component part to be potentially additionally connected, for example a Zener diode for protecting the microphone against voltage punctures due to electrostatic charging. The contacting of the electret microphone is indicated by the surface 19, whereas the surfaces 20 and 21 can be employed for contacting the aforementioned, additional electrical component part. As may also be seen from FIGS. 3 and 4, insulation displacement contacts 10 are provided for the contacting of the conductor pair 7. These contacts 10 are composed of a strain relief area and of the actual contact area, as already previously mentioned. The strain relief areas 22, given this microphone module, are designed such that the receptacle slot has a somewhat smaller width than the outside diameter of the insulated conductor, so that the respective conductor is held lightly clamped at its insulation in this area. The clamping slot located between the two strain relief areas and provided in the sheet metal 23 is dimensioned with respect to its width such that the insulation of the conductor is parted and an electrical contact between the conductor and the sheet metal 23 is thus produced.

FIGS. 5 and 6 show a further possible design of the microphone module 5, whereby this embodiment can be manufactured with an automatic fabrication unit.

This microphone module 5 is composed of a base member 24 at which a receptacle 25 for a commercially obtainable electret microphone 26 as well as U-shaped strain relief elements 27 and 28, a plurality of domes 29, and resilient pegs 30 and 31 are provided. The structurally identical contact springs 32 and 33 comprise a plurality of holes 34 corresponding in number to the plurality of domes 29. The contact springs 32 and 33 are mechanically connected to the base member 24 as a result of heat-deformation after their application onto the domes 29. The contact springs have webs 35 and 36 that are first bent away from their base surfaces and are subsequently bent toward one another and that comprise slot-shaped contact receptacles at their free end regions for the terminal pins 37 and 38 of the electret microphone 26. These webs 35 and 36 are held in guides 39 at the receptacle 25 for the electret microphone that are matched to them in terms of contour. The contact springs 32 and 33 further comprise clamping contacts 40 and 41 that proceed perpendicularly from their base areas and wherein the conductor pair 7 is electrically contacted to the microphone module. As already mentioned, the resilient pegs 30 and 31 are arranged at the base member 24 which serve the purpose, for example, of providing a clampable acceptance for an electrical component part, for example of the capacitor 42. After the introduction of the electret microphone into the receptacle 25 with a correct polarization, the contact springs 32 and 33 are joined to the base member by heat-deformation of the domes 29. Subsequently, the terminal pins 37 and 38 as well as the electrical component part 42 held between the pegs 30 and 31 are joined to the contact springs by soldering.

The base member likewise comprises annular contours (not shown in detail here) at its underside, these cooperating with corresponding annular receptacles in the lower shell 3 of the handset 1. After the introduction of the microphone module into the lower shell of the handset, the electrical connection thereof to the conductor pair 7 can be implemented.

Although various minor changes and modifications might be proposed by those skilled in the art, it will be understood that we wish to include within the scope of the patent warranted hereon, all such changes and modifications as reasonably come within our contribution to the art.

We claim as our invention:

1. A handset for a telephone station, comprising:

a housing formed of an upper shell joined to a lower shell;

a telephone receiver and a transmitter capsule arranged in the housing;

a connecting cord connected to the housing and having lines for connection to the telephone receiver and to the transmitter capsule, and wherein insulation displacement contacts are provided at least at the transmitter capsule for connection to the lines of the connecting cord for the transmitter capsule;

the transmitter capsule comprising an electret microphone mounted on a holder;

said holder having a contour on a lower surface for matching to a required antechamber volume of the handset and said holder on an upper surface opposite said lower surface having two spaced apart contact springs mounted thereon, each contact spring at a first end having one of said insulation displacement contacts for connection to one of the respective lines of the connecting cord for the transmitter capsule, and at an opposite second end each contact spring having a slot-shaped contact receptacle into which one of the respective terminal pins of the microphone is received.

2. A handset according to claim 1 wherein on a lower shell of the handset an annular receptacle is provided and wherein said holder contour comprises an annular contour which is mateable with and pressed onto the annular receptacle for mounting of the holder since the annular contour and annular receptacle are matched in terms of their respective diameters.

3. A handset according to claim 1 wherein said holder comprises a base member with a receptacle thereon for receiving the electret microphone, fastening means connecting the contact springs to the base member, and resilient pegs on the base member for clamping acceptance of additional electrical component parts.

4. A handset according to claim 1 wherein said holder comprises a base member, said base member has a plurality of domes, and wherein said contact springs are provided on said base member having holes which engage with the domes.

5. A handset for a telephone station, comprising:

a housing formed of an upper shell joined to a lower shell:

a telephone receiver and a transmitter capsule arranged in the housing:

a connecting cord connected to the housing and having lines for connection to the telephone receiver and to the transmitter capsule, and wherein insulation displacement contacts are provided at the telephone receiver and at the transmitter capsule for connection to an electrical contact with the lines:

the transmitter capsule comprising an electret microphone mounted on a holder:

said holder being shaped so that it can be universally employed in a plurality of different handset types and having a contour for matching to a required antechamber volume of the handset; and said holder comprising a base member and wherein contact springs having holes are mounted to the base member, said contact springs each having regions angularly bent off relative to a base portion of the contact springs, webs angularly extending from the bent off regions and directed toward one another, and said webs having terminal contacts for connecting to terminal pins of said electret microphone.

6. A handset according to claim 1 wherein said insulation displacement contacts at the ends of the contact springs comprise at least one strain relief element adjacent thereto and mounted on the holder.

7. A telephone handset, comprising:

a housing shell having a telephone receiver within an interior and at one end of the shell and a microphone module arranged within the interior and at an opposite end of the shell;

a connecting cord connecting to the shell, said connecting cord having electrical lines therein;

said telephone receiver and said microphone module each having electrical contacts for connection to corresponding lines of said connection cord;

said microphone module comprising a holder having at a first surface thereof said electrical contacts, an electret microphone, and a mounting structure for mounting the electret microphone to said first surface;

a receptacle in said shell;

a contour on a second surface opposite the first surface of said holder, said contour being dimensioned to mate with and be pressed on said receptacle for mounting the holder to said housing shell, and said contour being dimensioned so that a region defined by said contour and said receptacle is dimensioned to match a required antechamber volume of the handset; and said electrical contacts and said first surface of said microphone module having respective ends adjacent said electret microphone and being bent so that slot-shaped contact receptacles at said ends mate with respective terminal pins of the microphone which pass through said slot-shaped contact receptacles at substantially right angles.

8. A handset according to claim 7 wherein the receptacle is an annular receptacle projecting upwardly from a portion of said shell having acoustic transmission openings and wherein said contour comprises an annular contour, and wherein diameters of the annular contour and annular receptacle are selected so that the annular receptacle and annular contour mate with and are pressed on one another.

9. A telephone handset, comprising:

a housing formed of upper and lower shells;

the lower shell having a telephone receiver mounted at one end threof and a microphone module mounted at an opposite end threof adjacent acoustic openings;

a receptacle surrounding said acoustical openings;

said microphone module comprising a base member having a contour extending from one surface thereof, said contour being dimensioned to mate with said receptacle, and said contour being dimensioned to match a desired antechamber volume of said handset;

on a further surface of said base member opposite said one surface first and second contact springs being mounted, said contact springs having upwardly extending bent portions and angularly extending webs from the bent portions having contacts for connection to pins of an electret microphone mounted on said further surface of said base member;

a handset connecting cord connected to said housing and having wires therein, respective ones of said wires connecting to said telephone receiver and other respective ones of said wires connecting to further contacts on said contact springs; and wherein said contact spring further contacts comprise insulation displacement contacts for cutting through insulation on the wires connecting to said further contacts when the wires are forced down into insulation parting slots of said insulation displacement contacts.

* * * * *